(12) United States Patent
Kim et al.

(10) Patent No.: US 12,026,507 B2
(45) Date of Patent: Jul. 2, 2024

(54) METHOD AND APPARATUS FOR PROVIDING PLATFORM-INTEGRATED SDK CAPABLE OF DEVELOPING MULTIPLE PLATFORMS WITH SINGLE SOURCE CODE

(71) Applicant: FakeEyes Co., Ltd., Seoul (KR)

(72) Inventors: Seok Joong Kim, Seoul (KR); Min Seung Son, Seoul (KR); Do Yeong Kim, Seoul (KR)

(73) Assignee: FakeEyes Co., Ltd., Seoul (KR)

( * ) Notice: Subject to any disclaimer, the term of this patent is extended or adjusted under 35 U.S.C. 154(b) by 114 days.

(21) Appl. No.: 17/852,458

(22) Filed: Jun. 29, 2022

(65) Prior Publication Data

US 2023/0004382 A1    Jan. 5, 2023

(30) Foreign Application Priority Data

Jul. 2, 2021    (KR) .................... 10-2021-0087426

(51) Int. Cl.
*G06F 8/71* (2018.01)
*G06F 8/36* (2018.01)

(52) U.S. Cl.
CPC . *G06F 8/71* (2013.01); *G06F 8/36* (2013.01)

(58) Field of Classification Search
None
See application file for complete search history.

(56) References Cited

U.S. PATENT DOCUMENTS

| | | | | |
|---|---|---|---|---|
| 7,610,577 | B1 * | 10/2009 | Roth | G06F 8/71 |
| | | | | 717/106 |
| 9,239,705 | B2 * | 1/2016 | Chandaria | G06F 9/44536 |
| 9,678,726 | B1 * | 6/2017 | Massaguer | G06F 11/36 |
| 2003/0135844 | A1 * | 7/2003 | Yellin | G06F 11/3612 |
| | | | | 717/126 |
| 2003/0145190 | A1 * | 7/2003 | Faraboschi | G06F 9/3842 |
| | | | | 712/E9.05 |
| 2005/0071805 | A1 * | 3/2005 | Lauterbach | G06F 8/20 |
| | | | | 717/107 |

(Continued)

FOREIGN PATENT DOCUMENTS

| | | | |
|---|---|---|---|
| CN | 111445274 | A * | 7/2020 |
| KR | 10-2013-0094003 | A | 8/2013 |

(Continued)

OTHER PUBLICATIONS

Gonsalves, Michael, "Evaluating the Mobile Development Frameworks Apache Cordova and Flutter and Their Impact on the Development Process and Application Characteristics," Cal. State Chico, 2018. (Year: 2018).*

(Continued)

*Primary Examiner* — Ryan D. Coyer
(74) *Attorney, Agent, or Firm* — Revolution IP, PLLC (57) ABSTRACT

A method for providing a platform-integrated SDK capable of developing multiple platforms with single source code, includes: receiving, from a user, a build instruction in which any one of the multiple platforms is designated as a build target platform, with respect to source code integrally written for the multiple platforms; importing a software development kit (SDK), among pre-stored SDKs, corresponding to the build target platform; building the source code after the SDK is imported; and providing the built object file to the user.

7 Claims, 6 Drawing Sheets

(56) References Cited

U.S. PATENT DOCUMENTS

| | | | | |
|---|---|---|---|---|
| 2010/0057427 | A1* | 3/2010 | Walker | G06F 9/3844 |
| | | | | 711/E12.017 |
| 2013/0326487 | A1* | 12/2013 | Yousouf | G06F 9/455 |
| | | | | 717/134 |
| 2017/0351514 | A1* | 12/2017 | Chou | G06Q 10/10 |
| 2019/0004774 | A1* | 1/2019 | Mount | G06F 8/76 |
| 2020/0242007 | A1* | 7/2020 | Davis | G06F 11/366 |

FOREIGN PATENT DOCUMENTS

| | | |
|---|---|---|
| KR | 10-2016-0061305 A | 5/2016 |
| KR | 10-2018-0027031 A | 3/2018 |

OTHER PUBLICATIONS

Dagne, Lukas, "Flutter for cross-platform App and SDK development," Metropolia University of Applied Sciences, 2019. (Year: 2019).*

Napoli, Marco L., "Beginning Flutter a Hands on Guide to App Development," Wiley, 2020. (Year: 2020).*

Payne, Rap, "Beginning App Development with Flutter," apress, 2019. (Year: 2019).*

* cited by examiner

METHOD AND APPARATUS FOR PROVIDING PLATFORM-INTEGRATED SDK CAPABLE OF DEVELOPING MULTIPLE PLATFORMS WITH SINGLE SOURCE CODE

CROSS-REFERENCE TO RELATED APPLICATION

This application claims priority under 35 USC § 119 to Korean Patent Application No. 10-2021-0087426 filed on Jul. 2, 2021 in the Korean Intellectual Property Office (KIPO), the entire disclosure of which is incorporated herein by reference.

BACKGROUND OF THE INVENTION

1. Field of the Invention

The present invention relates to a method and an apparatus for providing a platform-integrated SDK capable of developing multiple platforms with single source code.

2. Description of the Related Art

The content described below merely provides background information related to the embodiment according to the present invention and does not constitute the prior art.

As virtual reality (VR) devices diversify, the need for developing software for different platforms is emerging. However, various problems may occur due to conflicts between codes when SDKs are simultaneously imported to enable one project to be operable on various VR devices. In addition, a lot of human resources and times are required for the multi-platform development due to the different SDK structure for each device and each platform during VR software development.

SUMMARY OF THE INVENTION

An object of the present invention is to provide a platform-integrated SDK capable of developing multiple platforms with single source code.

In addition, an object of the present invention is to reduce the required human resources and times through development using single source code.

In order to achieve the above objects, the method for providing a platform-integrated SDK capable of developing multiple platforms with single source code according to one embodiment of the present invention may include the steps of: receiving, from a user, a build instruction in which any one of the multiple platforms is designated as a build target platform, with respect to source code integrally written for the multiple platforms; importing a software development kit (SDK), among pre-stored SDKs, corresponding to the build target platform; building the source code after the SDK is imported; and providing the built object file to the user.

The source code may include in-app purchase processing code, and the in-app purchase processing code may include code in which a child class is overridden to branch an in-app purchase processing operation through a first preprocessor when the any one of the platforms is designated as the build target platform.

The importing of the SDK may include determining whether code bases of the platforms are similar to each other; and deciding an SDK import scheme based on whether the code bases are similar to each other, and may further include setting a rendering environment based on the build target platform after the importing of the SDK; and setting a build environment based on the build target platform.

The deciding of the SDK import scheme based on whether the code bases are similar to each other may include: importing a first SDK corresponding to each of the platforms together when the code bases of the platforms are similar to each other, and adding code for allowing an application of components included in the first SDK to be branched through a second preprocessor when the any one of the platforms is designated as the build target platform; or importing only a second SDK corresponding to the build target platform when the code bases of the platforms are not similar to each other.

The setting of the rendering environment may include disposing a rendering camera included in the SDK corresponding to the build target platform.

The source code may further include rendering processing code, and the rendering processing code may include code for allowing a rendering processing operation to be branched through the first preprocessor.

The setting of the build environment may include changing a build setting value of development software to a build setting value corresponding to the build target platform; and overwriting a manifest file included in the source code with a manifest file corresponding to the build target platform.

The development software may be, for example, development software corresponding to at least one of Unity engine, Unreal engine, Cry engine, Source engine, and Havok engine, and the type of engine corresponding to the development software in the present invention is not limited to the above example.

The method may include storing a first manifest file corresponding to each of the platforms in a first folder that is not included in the build, before the overwriting with the manifest file, and the overwriting with the manifest file may include overwriting a second manifest file corresponding to the build target platform among the first manifest files in a folder in which the manifest file included in the source code is located.

SDKs corresponding to the platforms may be compressed and stored in the pre-stored SDKs, respectively.

In addition, the apparatus for providing a platform-integrated SDK capable of developing multiple platforms with single source code according to one embodiment of the present invention may include a memory in which at least one program is recorded, and a processor for executing the program, in which the program may include instructions for executing: receiving, from a user, a build instruction in which any one of the multiple platforms is designated as a build target platform, with respect to source code integrally written for the multiple platforms; importing a software development kit (SDK), among pre-stored SDKs, corresponding to the build target platform; building the source code after the SDK is imported; and providing the built object file to the user.

According to the present invention, the platform-integrated SDK capable of developing multiple platforms with single source code can be provided.

In addition, according to the present invention, the required human resources and times can be reduced through development using single source code.

DETAILED DESCRIPTION OF THE INVENTION

The present invention will be described in detail with reference to the accompanying drawings as follows. Herein, repeated descriptions and detailed descriptions for known functions and configurations that may unnecessarily obscure the essentials of the invention will be omitted. The embodiments of the present invention are provided in order to more completely describe the present invention to those having ordinary skill in the art. Accordingly, the shapes and sizes of components in the drawings may be exaggerated for clearer description.

Throughout the specification, when a part "includes" a certain component, the above expression does not exclude other components, but may further include the other components, unless particularly stated otherwise Hereinafter, exemplary embodiments according to the present invention will be described in detail with reference to the accompanying drawings.

Figure 1:
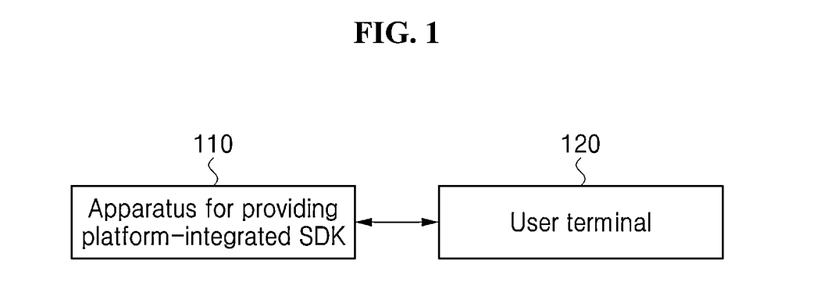
FIG. 1 is a block diagram showing subjects for providing a platform-integrated SDK capable of developing multiple platforms with single source code according to one embodiment of the present invention.

FIG. 1 is a block diagram showing subjects for providing a platform-integrated SDK capable of developing multiple platforms with single source code according to one embodiment of the present invention.

Referring to FIG. 1, the subjects for providing a platform-integrated SDK capable of developing multiple platforms with single source code according to one embodiment of the present invention include an apparatus 110 for providing a platform-integrated SDK capable of developing multiple platforms with single source code, and a user terminal 120.

The apparatus 110 for providing a platform-integrated SDK capable of developing multiple platforms with single source code may refer to an apparatus that receives a user's build instruction from the user terminal 120.

The apparatus 110 for providing a platform-integrated SDK capable of developing multiple platforms with single source code may refer to an apparatus that receives customized service provision data reflecting user's body measurement data from the user terminal 120 to provide a customized service to the user terminal 120.

The user terminal 120 may refer to a device that provides a build instruction inputted by the user to the apparatus 110 for providing a platform-integrated SDK capable of developing multiple platforms with single source code.

Figure 2:
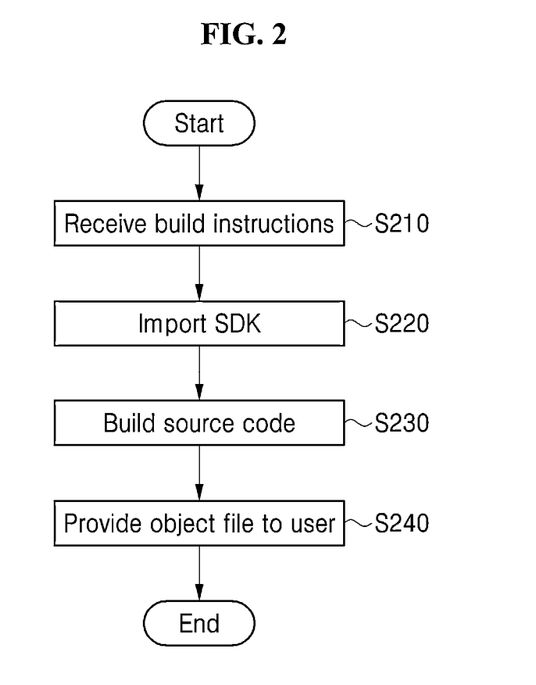
FIG. 2 is an operational flow chart showing a method for providing a platform-integrated SDK capable of developing multiple platforms with single source code according to one embodiment of the present invention.

FIG. 2 is an operational flow chart showing a method for providing a platform-integrated SDK capable of developing multiple platforms with single source code according to one embodiment of the present invention.

Refer to FIG. 2 according to the method for providing a platform-integrated SDK capable of developing multiple platforms with single source code according to one embodiment of the present invention. First, a build instruction in which any one of the multiple platforms is designated as a build target platform may be received from a user (S210).

The source code may include in-app purchase processing code.

At this point, the in-app purchase processing code may include code in which a child class is overridden to branch an in-app purchase processing operation through a first preprocessor when the any one of the platforms is designated as the build target platform.

For example, in the case of Xiaomi platform, because an app is required to be activated before proceeding with in-app purchase (TAP), the activation proceeds before initializing an IAP manager. In the case of Google platform, a universally unique identifier (uuid) of a product is locally defined, the locally defined product ID is collated with a product ID present on a server, and the payment proceeds when the collation matches. In the case of Oculus platform, the uuid list of the product is received from the server and then the payment proceeds with the received value. As in the above, because the in-app purchase processing operation for each platform is different, the operation may be branched to be processed in response to a platform designated as a build target platform through the first preprocessor.

Next, the SDK corresponding to the build target platform among pre-stored SDKs may be imported (S220).

SDKs corresponding to the platforms may be compressed and stored in the pre-stored SDKs, respectively.

Next, the source code may be built after the SDK is imported (S230).

Next, the built object file may be provided to the user (S240).

Figure 3:
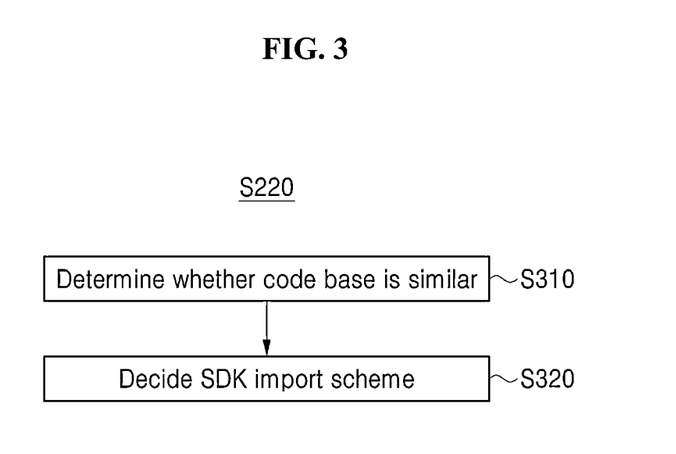
FIG. 3 is an operational flow chart showing a method for providing a platform-integrated SDK capable of developing multiple platforms with single source code according to one embodiment of the present invention.

FIG. 3 is an operational flow chart showing a method for providing a platform-integrated SDK capable of developing multiple platforms with single source code according to one embodiment of the present invention.

Refer to FIG. 3 according to the method for providing a platform-integrated SDK capable of developing multiple platforms with single source code according to one embodiment of the present invention. First, it may be determined whether the code bases of the platforms are similar to each other (S310).

Next, an SDK import scheme may be decided based on whether the code bases are similar (S320).

At this point, when the code bases of the platforms are similar to each other, a first SDK corresponding to each of the platforms may be imported together, and when the any one of the platforms is designated as the build target platform, code for allowing an application of components included in the first SDK to be branched through a second preprocessor may be added.

Figure 6:
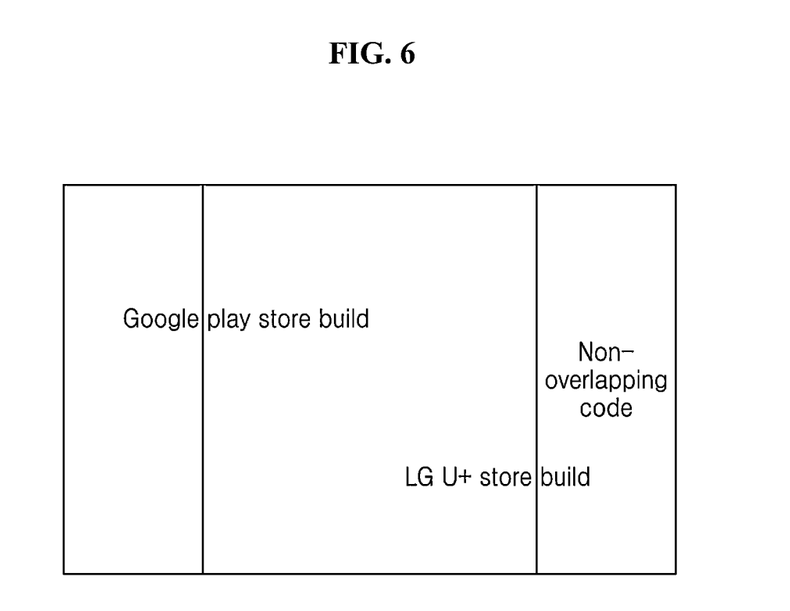
FIG. 6 is a diagram showing an example in which code bases of platforms are similar to each other.

For example, referring to FIG. 6, in the case of Google platform and LG U+ platform that have similar code bases of the platforms, SDKs corresponding to the platforms, respectively, may be imported together. In addition, when the LG U+ platform is designated as the build target platform, code for allowing the application of non-overlapping code to be branched through the second preprocessor may be added. The above example is only an example according to one embodiment, and does not limit the scope of the present invention.

When the code bases of the platforms are not similar to each other, only the second SDK corresponding to the build target platform may be imported.

Figure 4:
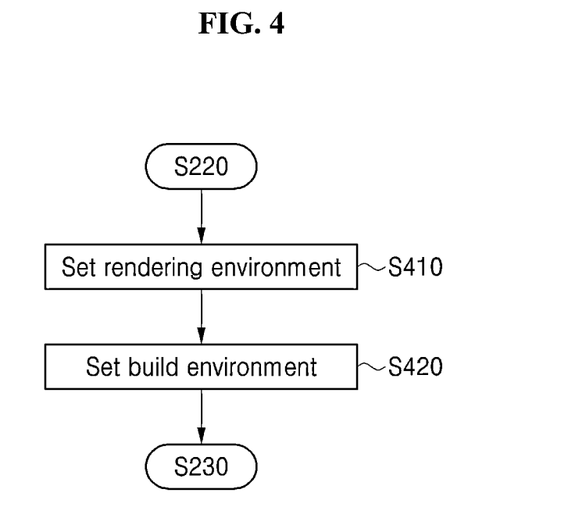
FIG. 4 is an operational flow chart showing a method for providing a platform-integrated SDK capable of developing multiple platforms with single source code according to one embodiment of the present invention.

FIG. 4 is an operational flow chart showing a method for providing a platform-integrated SDK capable of developing multiple platforms with single source code according to one embodiment of the present invention.

Refer to FIG. 4 according to the method for providing a platform-integrated SDK capable of developing multiple platforms with single source code according to one embodiment of the present invention. After importing the SDK, a rendering environment may be set based on the build target platform (S410).

At this point, a rendering camera included in the SDK corresponding to the build target platform may be disposed.

The source code may further include rendering processing code, and the rendering processing code may include code for allowing a rendering processing operation to be branched through the first preprocessor.

As a selective embodiment, an exception handling may be additionally performed by using a scripting define symbol for IAP, if necessary.

For example, when the build target platform is Oculus, a screen rendered by a main camera may be rendered in stereo in the development software without additional processing. On the contrary, when the build target platform is Google, the above function is not provided by the development software, so a separate rendering camera may be disposed to set a rendering environment.

For another example, during processing an overlay UI using a canvas, two images may appear when the UI is excessively close. At this point, when the build target platform is Oculus, the problem may be solved by using Monoscopic as its own option. However, because the Monoscopic option is not provided when the build target platform is Google, the problem may be solved by applying an additional script corresponding to the Monoscopic option to the camera. The above example is only an example according to one embodiment, and does not limit the scope of the present invention.

Next, the build environment may be set based on the build target platform (S420).

Figure 5:
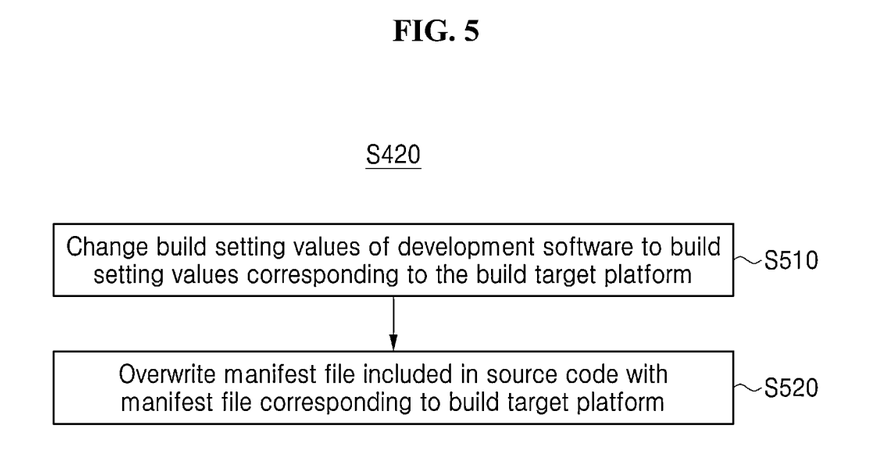
FIG. 5 is an operational flow chart showing a method for providing a platform-integrated SDK capable of developing multiple platforms with single source code according to one embodiment of the present invention.

FIG. 5 is an operational flow chart showing a method for providing a platform-integrated SDK capable of developing multiple platforms with single source code according to one embodiment of the present invention.

Refer to FIG. 5 according to the method for providing a platform-integrated SDK capable of developing multiple platforms with single source code according to one embodiment of the present invention. First, a build setting value of the development software may be changed to a build setting value corresponding to the build target platform (S510).

Figure 7:
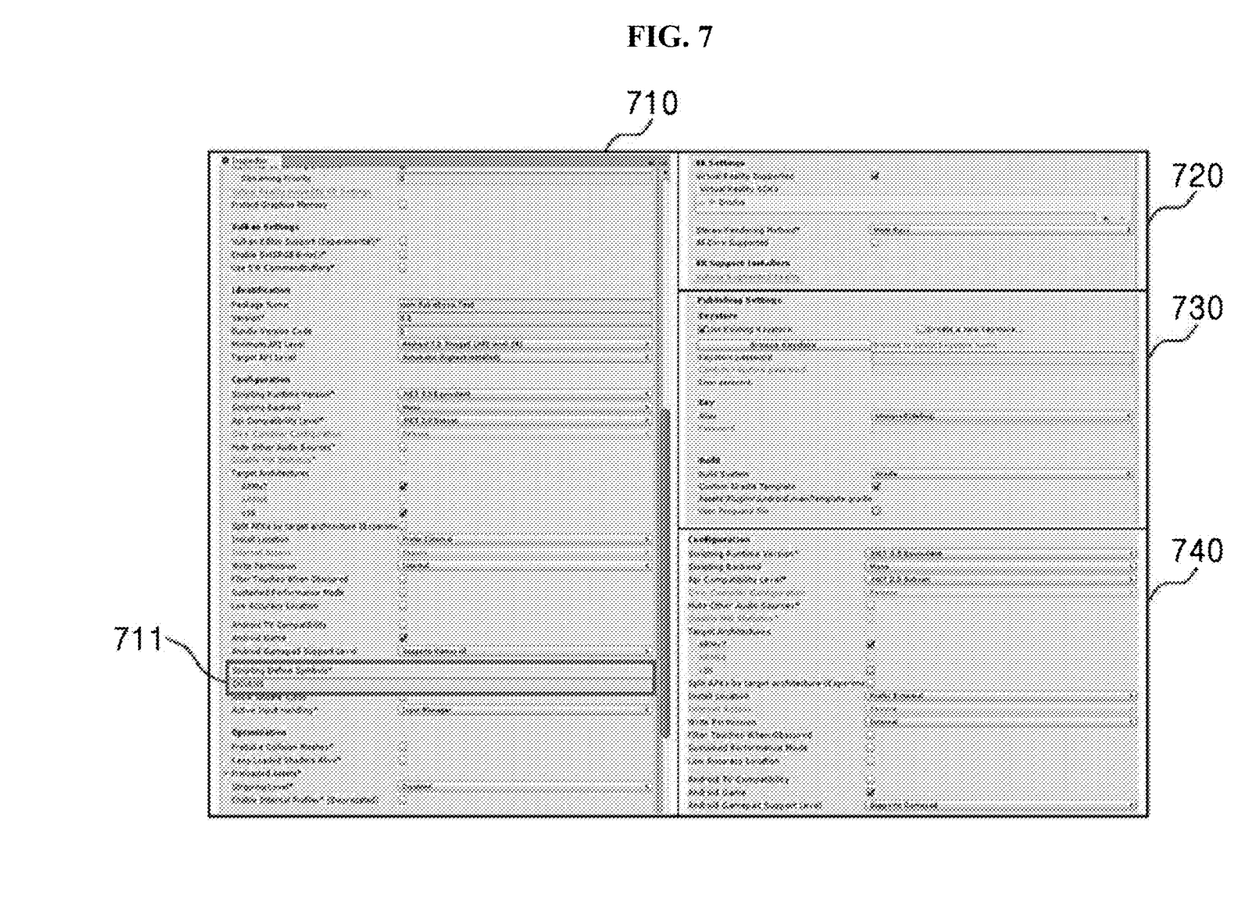
FIG. 7 is a diagram showing an example of a build setting screen of development software.

FIG. 7 is a diagram showing an example of a build setting screen of development software. The build setting value of the development software may be changed to a build setting value corresponding to the build target platform on the build setting screen.

For example, when the build target platform is Oculus, "OCULUS" may be inputted to the item Scripting Define Symbol 711 in Other Settings 710. In addition, items Configuration of XR Settings 720, Publishing Settings 730, and Other Settings 710 may be changed to the build setting values corresponding to Oculus as the build target platform. The above example is only an example according to one embodiment, and does not limit the scope of the present invention.

Next, a manifest file included in the source code may be overwritten with a manifest file corresponding to the build target platform (S520).

Before the overwriting with the manifest file, the method may include storing a first manifest file corresponding to each of the platforms in a first folder that is not included in the build. In addition, step S520 may include overwriting a second manifest file corresponding to the build target platform among the first manifest files in a folder in which the manifest file included in the source code is located.

Figure 8:
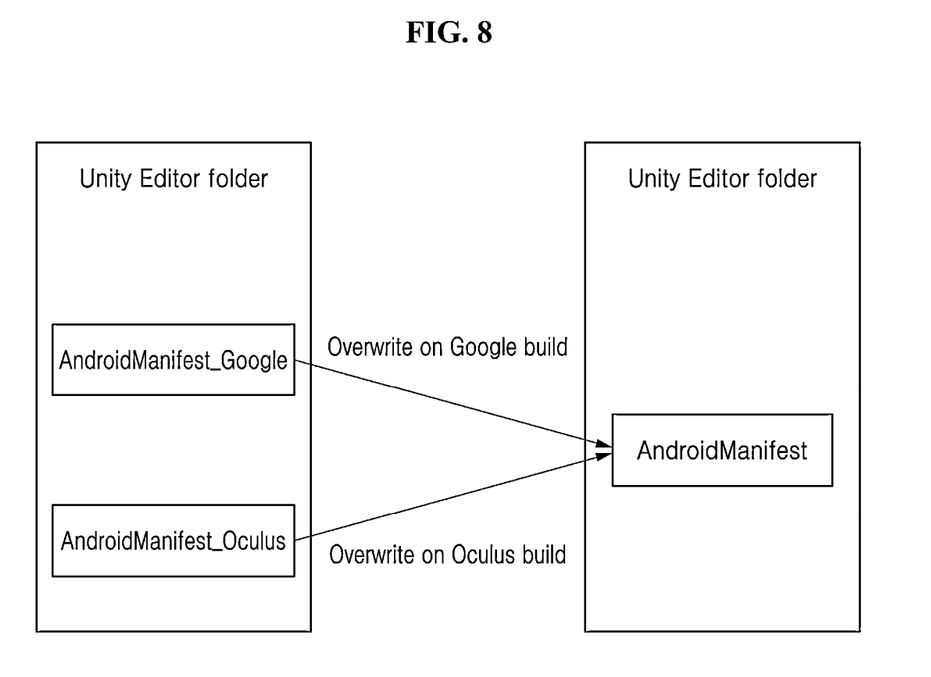
FIG. 8 is a diagram showing an example of a folder for saving a manifest file and a folder for overwriting the manifest file.

For example, referring to FIG. 8, the first manifest file corresponding to each of the platforms may be stored in a specific folder (such as a folder Unity Editor). The specific folder may be a first folder that is not included in the build. In addition, during build, the second manifest file corresponding to the build target platform may be overwritten in another folder (such as a folder Unity Plugins) in which the manifest file included in the source code is located. At this point, other files (such as a file Keystore) may be pasted together in addition to the manifest file. The file Keystore may be overwritten while overwriting the manifest file.

Figure 9:
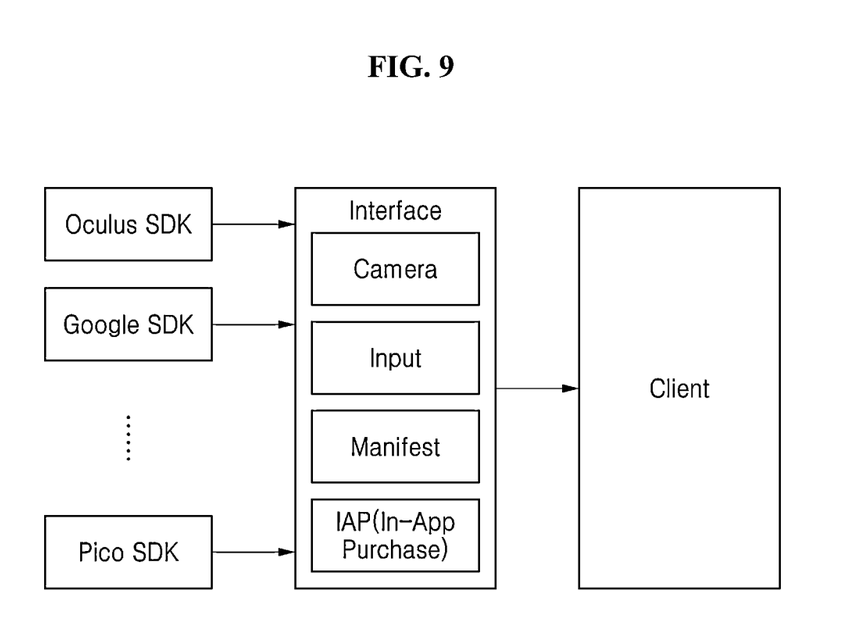
FIG. 9 is a flow chart showing in the case of using the apparatus for providing a platform-integrated SDK capable of developing multiple platforms with single source code according to one embodiment of the present invention.

FIG. 9 is a flow chart showing in the case of using the apparatus for providing a platform-integrated SDK capable of developing multiple platforms with single source code according to one embodiment of the present invention.

Referring to FIG. 9, it can be seen that multiple SDKs, such as Oculus, Google and Pico, are imported into the development software through the interface of the apparatus for providing the platform-integrated SDK according to the present invention.

Figure 10:
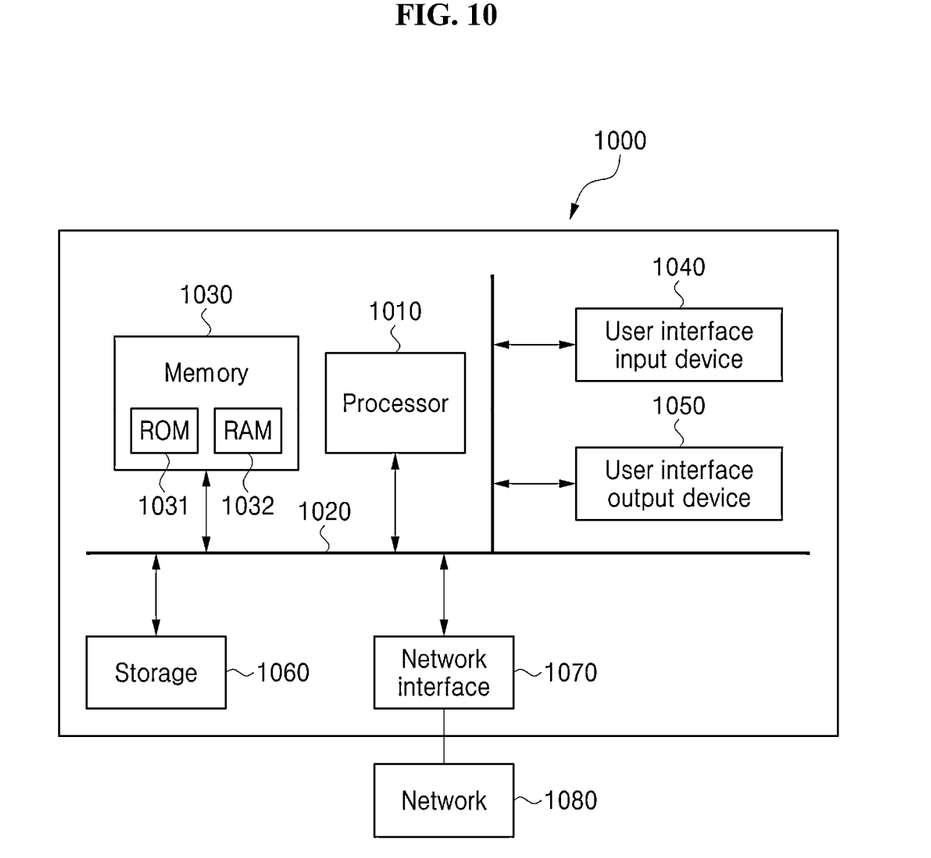
FIG. 10 is a view showing a computer system according to one embodiment of the present invention.

FIG. 10 is a view showing a computer system according to one embodiment of the present invention.

The apparatus for providing a platform-integrated SDK capable of developing multiple platforms with single source code according to one embodiment of the present invention may be implemented in a computer system 1000 such as a computer-readable recording medium.

Referring to FIG. 10, the computer system 1000 may include at least one processor 1010, memory 1030, user interface input device 1040, user interface output device 1050, and storage 1060 that communicate with each other via a bus 1020. In addition, the computer system 1000 may further include a network interface 1070 connected to network 1080. The processor 1010 may be a central processing unit or a semiconductor device that executes processing instructions stored in the memory 1030 or the storage 1060. The memory 1030 and the storage 1060 may include various forms of volatile or non-volatile storage media. For example, the memory may include ROM 1031 or RAM 1032.

The specific implementations described in the present invention merely are embodiments, and do not intended to limit the scope of the present invention in any case. For clarity of the specification, the description of conventional electronic components, control systems, software, and other functional aspects of the above systems may be omitted. In addition, the connections or connecting members of lines between the components shown in the drawings exemplify functional connections and/or physical or circuit-wise connections, and alternative or additional various functional connections, physical connections, or circuit-wise connections may be embodied in actual devices. In addition, the corresponding component may not be required for applying the present invention, unless specifically stated as "essential", "important", or the like.

Accordingly, the spirit of the present invention will not be limited to the embodiments described above, and the claims described below and all ranges equivalent to or modified from the claims will fall within the scope of the spirit of the present invention.

What is claimed is:

1. A method for providing a platform-integrated software development kit capable of developing multiple platforms with single source code, the method comprising:
   receiving, from a user, a build instruction in which any one of the multiple platforms is designated as a build target platform, with respect to source code integrally written for the multiple platforms;
   importing a software development kit (SDK), among pre-stored SDKs, corresponding to the build target platform;
   building the source code after the SDK is imported; and
   providing the built object file to the user,
   wherein the source code includes in-app purchase processing code, and the in-app purchase processing code includes code in which a child class is overridden to branch an in-app purchase processing operation through a first preprocessor when the any one of the platforms is designated as the build target platform.

2. The method of claim 1, wherein the importing of the SDK includes:
   determining whether code bases of the platforms are similar to each other; and
   deciding an SDK import scheme based on whether the code bases are similar to each other, and
   further includes:
   setting a rendering environment based on the build target platform after the importing of the SDK; and
   setting a build environment based on the build target platform.

3. The method of claim 2, wherein the deciding of the SDK import scheme based on whether the code bases are similar to each other includes:
   importing a first SDK corresponding to each of the platforms together when the code bases of the platforms are similar to each other, and adding code for allowing an application of components included in the first SDK to be branched through a second preprocessor when the any one of the platforms is designated as the build target platform; or
   importing only a second SDK corresponding to the build target platform when the code bases of the platforms are not similar to each other.

4. The method of claim 2, wherein the setting of the rendering environment includes disposing a rendering camera included in the SDK corresponding to the build target platform.

5. The method of claim 4, wherein the source code further includes rendering processing code, and the rendering processing code includes code for allowing a rendering processing operation to be branched through the first preprocessor.

6. The method of claim 2, wherein the setting of the build environment includes:
   changing a build setting value of development software to a build setting value corresponding to the build target platform; and
   overwriting a manifest file included in the source code with a manifest file corresponding to the build target platform.

7. The method of claim 6, further comprising:
   storing a first manifest file corresponding to each of the platforms in a first folder that is not included in the build, before the overwriting with the manifest file, wherein
   the overwriting with the manifest file includes overwriting a second manifest file corresponding to the build target platform among the first manifest files in a folder in which the manifest file included in the source code is located.

* * * * *